United States Patent
Chuang et al.

(10) Patent No.: US 12,324,071 B2
(45) Date of Patent: Jun. 3, 2025

(54) ELECTRONIC LOCK

(71) Applicant: TONG LUNG METAL INDUSTRY CO., LTD., Minxiong Township, Chiayi County (TW)

(72) Inventors: Pai-Hsiang Chuang, New Taipei (TW); Jui-Chieh Cheng, Chiayi County (TW); Chen-Ming Lin, Chiayi County (TW); Ding-Sian Cai, Chiayi County (TW); Chun-Yi Fang, Yunlin County (TW); Matt Zimmer, Lake Forest, CA (US)

(73) Assignee: TONG LUNG METAL INDUSTRY CO., LTD., Minxiong Township (TW)

( * ) Notice: Subject to any disclaimer, the term of this patent is extended or adjusted under 35 U.S.C. 154(b) by 15 days.

(21) Appl. No.: 18/169,528

(22) Filed: Feb. 15, 2023

(65) Prior Publication Data
US 2023/0284357 A1    Sep. 7, 2023

(30) Foreign Application Priority Data
Mar. 1, 2022    (TW) .................................. 111202034

(51) Int. Cl.
*H05B 47/11* (2020.01)
*G01J 1/42* (2006.01)
(Continued)

(52) U.S. Cl.
CPC ............ *H05B 47/11* (2020.01); *G01J 1/4204* (2013.01); *G01J 5/0025* (2013.01); *G01S 17/04* (2020.01);
(Continued)

(58) Field of Classification Search
CPC ...... H05B 47/11; H05B 47/115; H05B 47/13; G01J 1/4204; G01J 5/0025; G01S 17/04;
(Continued)

(56) References Cited

U.S. PATENT DOCUMENTS

| | | | |
|---|---|---|---|
| 6,535,136 B1 * | 3/2003 | Rodenbeck | G06K 7/10128 235/382 |
| 2004/0012556 A1 * | 1/2004 | Yong | G06F 3/0202 345/102 |

(Continued)

FOREIGN PATENT DOCUMENTS

CN    111667616 A * 9/2020

*Primary Examiner* — Rufus C Point
(74) *Attorney, Agent, or Firm* — MUNCY, GEISSLER, OLDS & LOWE, P.C.

(57) ABSTRACT

An electronic lock includes a lock assembly configured to switch between a locking state and an unlocking state, and a control unit electrically connected to the lock assembly. The control unit includes an operation panel configured to receive a user input, a light sensor configured to measure intensity of ambient light and generate a light-sense signal, a proximity sensor configured to generate a wake signal, a backlight module configured to emit light from the operation panel, and a control module electrically connected to the lock assembly, the operation panel, the light sensor, the proximity sensor, and the backlight module. The control module is configured to control operation of the lock assembly based on the user input, activate the light sensor to measure the intensity of the ambient light, activate the backlight module to emit the light, and control the backlight module to adjust brightness of the light emitted thereby.

6 Claims, 2 Drawing Sheets

(51) Int. Cl.
  *G01J 5/00* (2022.01)
  *G01S 17/04* (2020.01)
  *G01V 3/08* (2006.01)
  *G07C 9/00* (2020.01)
  *G07C 9/20* (2020.01)
  *H05B 47/115* (2020.01)
  *H05B 47/13* (2020.01)

(52) U.S. Cl.
  CPC ......... *G01V 3/088* (2013.01); *G07C 9/00174* (2013.01); *G07C 9/20* (2020.01); *H05B 47/115* (2020.01); *H05B 47/13* (2020.01); *G07C 2209/64* (2013.01)

(58) Field of Classification Search
  CPC ...... G01V 3/088; G01V 8/12; G07C 9/00174; G07C 9/20; G07C 2209/64; G07C 9/0069; G07C 2009/00373
  See application file for complete search history.

(56) References Cited

U.S. PATENT DOCUMENTS

| | | | | |
|---|---|---|---|---|
| 2005/0249381 A1* | 11/2005 | Silvester | ................ | G06V 40/13 713/186 |
| 2008/0165116 A1* | 7/2008 | Herz | .................... | G09G 3/3406 345/98 |

* cited by examiner

ELECTRONIC LOCK

CROSS-REFERENCE TO RELATED APPLICATION

This application claims priority to Taiwanese Utility Model Patent Application No. 111202034, filed on Mar. 1, 2022.

FIELD

The disclosure relates to a lock, and more particularly to an electronic lock.

BACKGROUND

A conventional electronic lock is generally powered by a battery, and the conventional electronic lock is usually designed to enter a sleep mode when it has not been operated for a predetermined period of time, so as to reduce battery consumption. The conventional electronic lock exits the sleep mode when a user activates an operation panel and inputs instructions for an unlocking operation.

When the conventional electronic lock exists the sleep mode, it may immediately control a backlight module to emit light with a predetermined brightness, so as to light up the operation panel for the user's viewing and operation. However, such lighting with the predetermined brightness may be too bright for the user in a dark environment (e.g., at night time), which may cause discomfort to the user's eyes.

SUMMARY

Therefore, an object of the disclosure is to provide an electronic lock that can alleviate at least one of the drawbacks of the prior art.

According to the disclosure, the electronic lock adapted to be mounted on a door panel includes a lock assembly that has an outer surface and that is configured to switch between a locking state where the lock assembly locks the door panel and an unlocking state where the lock assembly does not lock the door panel, and a control unit that is disposed at the lock assembly and that is electrically connected to the lock assembly. The control unit includes an operation panel that is disposed on the outer surface of the lock assembly and that is configured to receive a user input, a light sensor that is disposed on the outer surface of the lock assembly and that is configured to measure intensity of ambient light and to generate a light-sense signal according to the intensity of the ambient light thus measured, a proximity sensor that is disposed on the outer surface of the lock assembly and that is configured to generate a wake signal upon detecting presence of an object, a backlight module that is configured to emit light outwardly from the operation panel, and a control module that is electrically connected to the lock assembly, the operation panel, the light sensor, the proximity sensor, and the backlight module. The control module is configured to control operation of the lock assembly based on the user input received from the operation panel, activate, upon receiving the wake signal from the proximity sensor, the light sensor to measure the intensity of the ambient light, activate, upon receiving the wake signal from the proximity sensor, the backlight module to emit the light, and control the backlight module to adjust brightness of the light emitted thereby according to the light-sense signal received from the light sensor.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
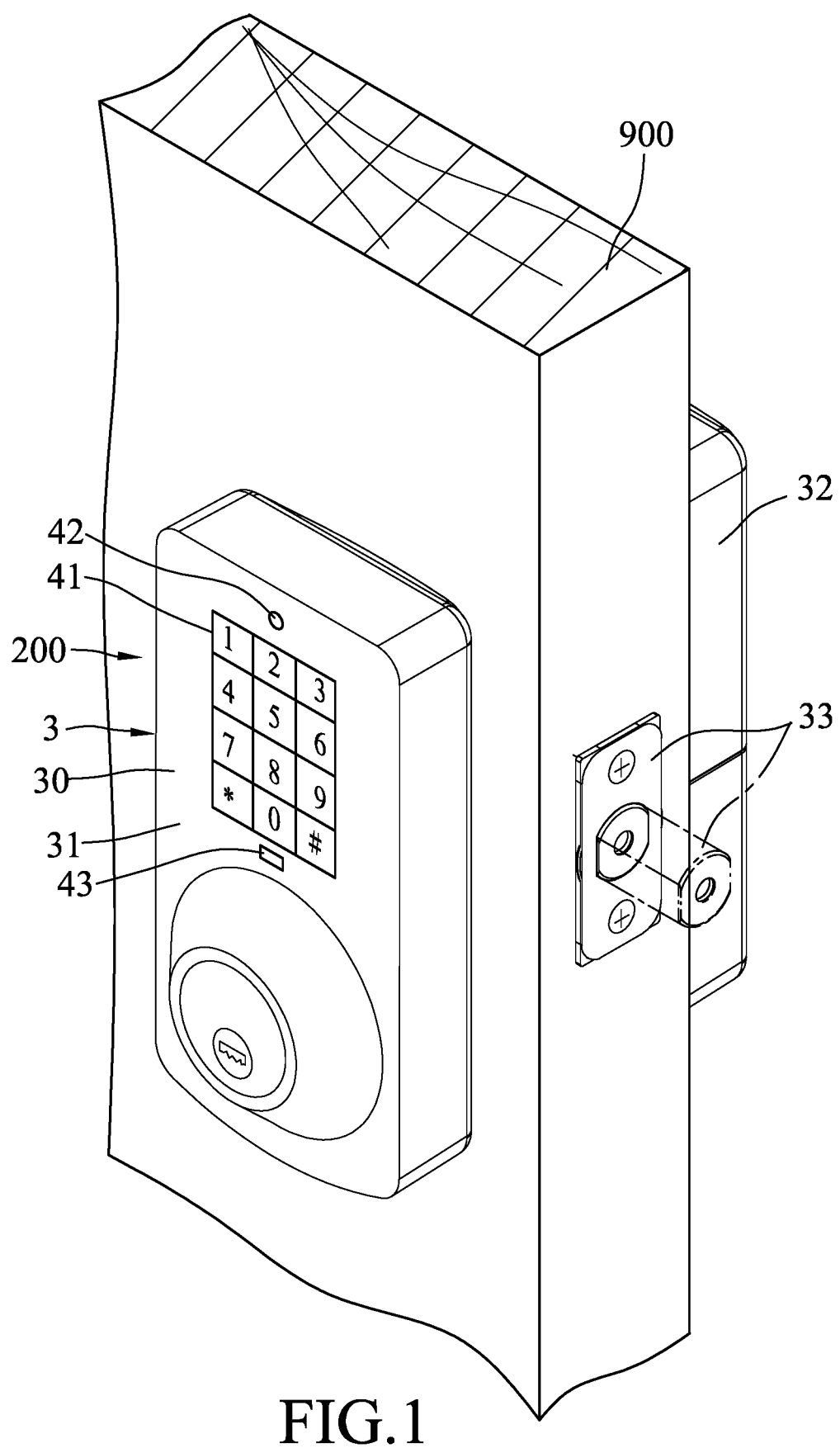
FIG. 1 is a partial perspective view partially illustrating an electronic lock mounted on a door panel according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
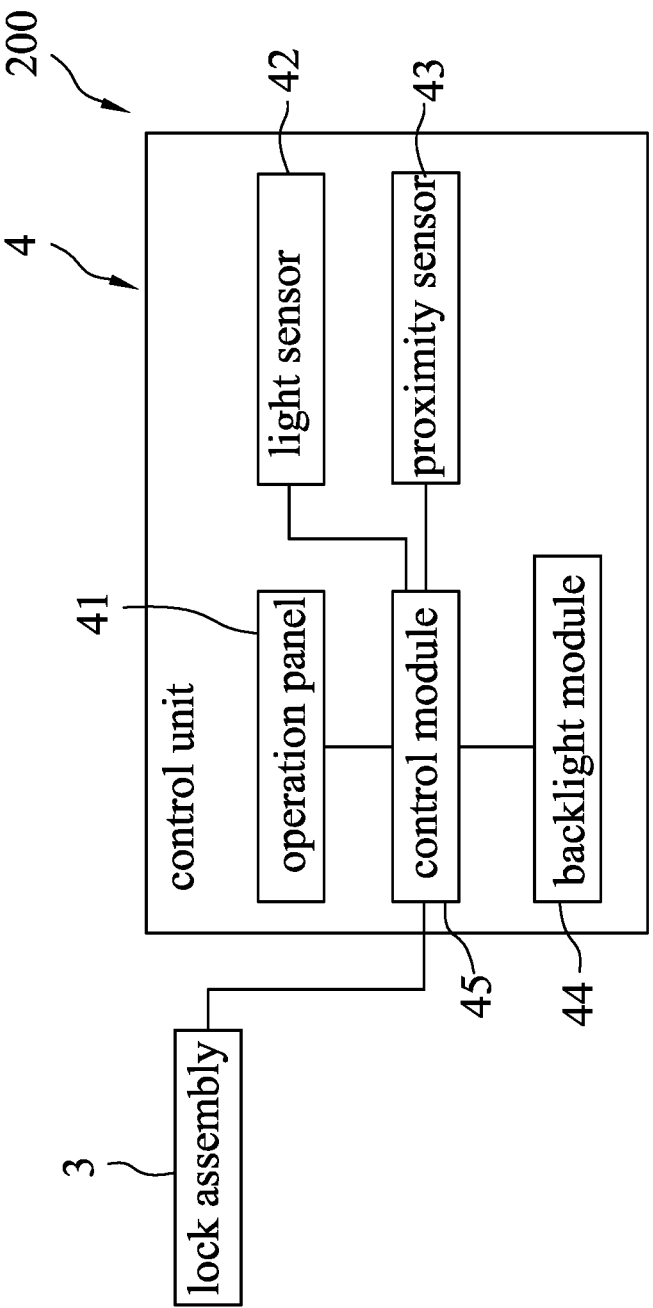
FIG. 2 is a block diagram illustrating the electronic lock.

Referring to FIGS. 1 and 2, an electronic lock 200 according to an embodiment of the disclosure is adapted to be mounted on a door panel 900. In this embodiment, the electronic lock 200 is mounted on the door panel 900 that is in a building and that is for a user to open for entering or exiting a space. The electronic lock 200 includes a lock assembly 3 that has an outer surface 30 and that is adapted to be mounted on the door panel 900, and a control unit 4 that is disposed at the lock assembly 3 and that is electrically connected to the lock assembly 3.

The lock assembly 3 includes an outer portion 31 that is adapted to be mounted on an outer side of the door panel 900 which faces outward with respect to the space, an inner portion 32 that is adapted to be mounted on an inner side of the door panel 900 which faces toward the space, and a deadbolt 33 that is disposed on one of a left side and a right side of the door panel 900. The lock assembly 3 is configured to, when being controlled by the user manually or by the control unit 4 electrically, switch between a locking state where the lock assembly 3 locks the door panel 900 and an unlocking state where the lock assembly 3 does not lock the door panel 900. When the lock assembly 3 is switched to the locking state, the deadbolt 33 protrudes from one of the left side and the right side of the door panel 900 into a door frame (not shown), so as to fasten the door panel 900 to the door frame, thus preventing the door panel 900 from being opened. Since the lock assembly 3 may be realized in numerous different forms, and is not the emphasis of this disclosure, it will not be described in further detail for the sake of brevity.

In this embodiment, the control unit 4 is disposed at the outer portion 31. The control unit 4 includes an operation panel 41, a light sensor 42, and a proximity sensor 43 that are all disposed on a part of the outer surface 30 corresponding to the outer portion 31 of the lock assembly 3, and a backlight module 44 and a control module 45 that are both disposed in the outer portion 31. The control module 45 is electrically connected to the lock assembly 3, the operation panel 41, the light sensor 42, the proximity sensor 43, and the backlight module 44.

The operation panel 41 is configured to receive a user input such as, but is not limited to, a set of password. In this embodiment, the operation panel 41 is a touch panel. In some embodiments, the operation panel 41 may be, but is not limited to, a physical key panel. Since the operation panel 41 may be realized in numerous different forms, it will not be described in further detail for the sake of brevity.

The light sensor 42 is configured to measure intensity of ambient light in the periphery of the outer portion 31, and generate a light-sense signal according to the intensity of the ambient light thus measured. The light sensor 42 may be, but is not limited to, a light sensing circuit including a photoresistor or other electronic components.

The proximity sensor 43 is configured to detect presence of an object in an area in front of the outer portion 31 (i.e., the object that appears in a field of view of the proximity sensor 43), and generate a wake signal upon detecting that the object is within a predetermined distance related to the field of view of the proximity sensor 43.

In this embodiment, the proximity sensor 43 is a photoelectric sensor that is configured to detect presence of the object by detecting a light beam that is transmitted by the photoelectric sensor and reflected back from the object within the predetermined distance, and generate the wake signal accordingly. In some embodiments, the proximity sensor 43 may be, but is not limited to, another photoelectric sensor that is configured to detect presence of the object by detecting light blocked by the object, and generate the wake signal when detecting light blocked by the object.

In addition, the proximity sensor 43 may be embodied by a capacitive sensor that is configured to detect presence of the object by measuring change in capacitance, and generate the wake signal accordingly. The capacitive sensor may be integrated with a capacitive touch panel that embodies the operation panel 41, and the capacitive touch panel is configured to detect presence of the object by measuring change in capacitance that results from the capacitive touch panel being touched by the object for operating the capacitive touch panel.

In some embodiments, the proximity sensor 43 may be embodied by a passive infrared sensor that is configured to detect presence of the object by detecting infrared light radiating from the object, and generate the wake signal accordingly.

In some embodiments, the proximity sensor 43 may be embodied by an electromagnetic inductive sensor that is configured to detect presence of the object by detecting a radio frequency signal transmitted by the object using electromagnetic induction technology, and generate the wake signal accordingly. The proximity sensor 43 may be embodied in numerous different forms and is not limited to the abovementioned examples.

The backlight module 44 is configured to emit light outwardly from the operation panel 41 so that the operation panel 41 may be viewed clearly. Since the backlight module 44 may be realized in numerous different forms, such as direct-lit backlight or edge-lit backlight, and is not the emphasis of this disclosure, it will not be described in further detail for the sake of brevity. In some embodiments, the backlight module 44 includes light-emitting diode (LED) backlights.

The control module 45 is configured to control operation of the lock assembly 3 based on the user input received from the operation panel 41, and switch between a work mode and a sleep mode, where the control module 45 switches from the sleep mode to the work mode upon receiving the wake signal. The control module 45 is further configured to, when operating in the work mode, activate the operation panel 41 to receive the user input, activate the light sensor 42 to measure the intensity of the ambient light, activate the backlight module 44 to emit the light, and control the backlight module 44 to adjust brightness of the light emitted thereby according to the light-sense signal received from the light sensor 42, so that the brightness of the light emitted by the backlight module 44 adjusts correspondingly to changes in the intensity of the ambient light. For example, when the intensity of the ambient light decreases, the control module 45 correspondingly adjusts the brightness of the light emitted by the backlight module 44 to decrease, so as to decrease the brightness of the light emitting out from the operation panel 41, thus preventing the operation panel 41 from appearing too bright to the user. In some embodiments, the control module 45 may be implemented by a central processing unit (CPU), a microprocessor, a mobile processor, a micro control unit (MCU), a digital signal processor (DSP), a field-programmable gate array (FPGA), or any circuit configurable/programmable in a software manner and/or hardware manner to implement functionalities of this disclosure.

The control module 45 is further configured to switch from the work mode to the sleep mode when the control module 45 has not received the wake signal for a predetermined time period (i.e., no object has been detected by the proximity sensor 43 for the predetermined time period). The control module 45 is further configured to, when operating in the sleep mode, control the backlight module 44 to stop emitting light, control the light sensor 42 to stop detecting light, and inactivate the operation panel 41, so as to reduce power consumption, until the control module 45 receives the wake signal for switching to the work mode from the sleep mode.

In this embodiment, the control unit 4 is disposed at the outer portion 31 of the lock assembly 3. In some embodiments, the control unit 4 may be disposed at the inner portion 32 of the lock assembly 3. In addition, in this embodiment, the electronic lock 200 is adapted to be mounted on the door panel 900 that is in the building and that is for the user to open for entering or exiting the space, and thus the lock assembly 3 includes the outer portion 31 and the inner portion 32 respectively installed on the outer side and the inner side of the door panel 900, so that the outer portion 31 and the inner portion 32 may be operated individually. In some embodiments, the electronic lock 200 may not include the inner portion 32 in circumstances where the door panel 900 does not need to be opened from the inner side, such as when the door panel 900 is a door of a safe.

In summary, the control module 45 is configured to, upon receiving the wake signal and thus switching to the work mode, adjust the brightness of the light emitted by the backlight module 44 according to the light-sense signal that is received from the light sensor 42, so that the brightness of the light emitting out from the operation panel 41 adjusts correspondingly to changes in the intensity of the ambient light, thus improving lighting quality and reducing power consumption of the electronic lock 200.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electronic lock adapted to be mounted on a door panel, comprising:
    a lock assembly having an outer surface, and being configured to switch between a locking state and an unlocking state; and
    a control unit disposed at said lock assembly and electrically connected to said lock assembly, said control unit including:
        an operation panel that is disposed on said outer surface of said lock assembly, and that is configured to receive a user input,
        a light sensor that is disposed on said outer surface of said lock assembly, and that is configured to measure intensity of ambient light and to generate a light-sense signal according to the intensity of the ambient light thus measured,
        a proximity sensor that is disposed on said outer surface of said lock assembly, and that is configured to generate a wake signal upon detecting presence of an object,
        a backlight module that is configured to emit light outwardly from said operation panel, and
        a control module that is electrically connected to said lock assembly, said operation panel, said light sensor, said proximity sensor, and said backlight module, and that is configured to:
            control operation of said lock assembly based on the user input received from said operation panel,
            upon receiving the wake signal from said proximity sensor, activate said light sensor to measure the intensity of the ambient light, and activate said backlight module to emit the light, and
            control said backlight module to adjust brightness of the light emitted thereby according to the light-sense signal received from said light sensor;
    wherein, when the intensity of the ambient light decreases, said control module correspondingly adjusts the brightness of the light emitted by said backlight module to decrease, so as to decrease the brightness of the light emitting out from said operation panel,
    wherein said control module is further configured to switch between a work mode and a sleep mode, operate in the work mode upon receiving the wake signal, and switch from the work mode to the sleep mode when said control module has not received the wake signal for a predetermined time period,
    wherein said control module is configured to, when operating in the work mode, activate said operation panel to receive the user input, activate said light sensor to measure the intensity of the ambient light, activate said backlight module to emit the light, and control said backlight module to adjust brightness of the light emitted thereby according to the light-sense signal received from said light sensor, so that the brightness of the light emitted by the backlight module adjusts corresponding to changes in the intensity of the ambient light,
    wherein said control module is further configured to, when operating in the sleep mode, control said backlight module to stop emitting the light, control said light sensor to stop detecting the light, and inactivate said operation panel, and
    wherein said control module is further configured to activate said operation panel upon receiving the wake signal.

2. The electronic lock as claimed in claim 1, wherein said proximity sensor is a capacitive sensor that is configured to detect presence of an object by measuring change in capacitance.

3. The electronic lock as claimed in claim 1, wherein said proximity sensor is a passive infrared sensor that is configured to detect presence of an object by detecting infrared light radiating from the object.

4. The electronic lock as claimed in claim 1, wherein said proximity sensor is a photoelectric sensor that is configured to detect presence of an object by detecting a light beam that is transmitted by the photoelectric sensor and reflected back from the object.

5. The electronic lock as claimed in claim 1, wherein said proximity sensor is a photoelectric sensor that is configured to detect presence of an object by detecting light blocked by the object.

6. The electronic lock as claimed in claim 1, wherein said proximity sensor is an electromagnetic inductive sensor that is configured to detect presence of an object by detecting a radio frequency signal transmitted by the object using electromagnetic induction technology.

* * * * *